Oct. 19, 1926.
T. MIDGLEY
METHOD OF FORMING TIRES
Filed March 1, 1921  5 Sheets-Sheet 2
1,603,856
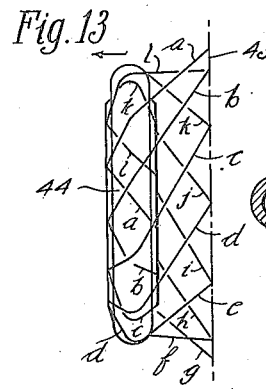
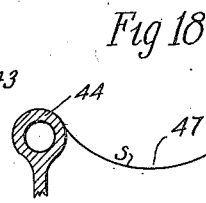
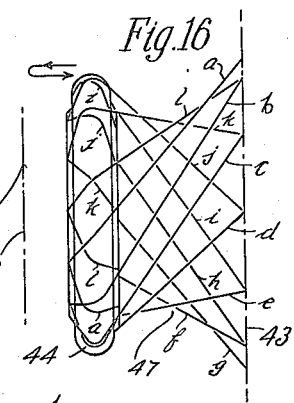
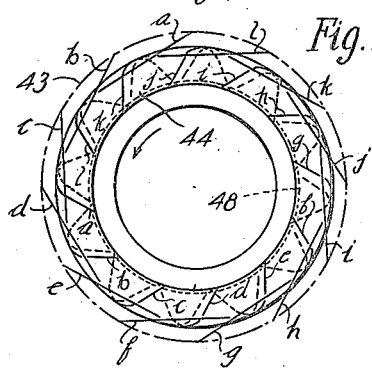
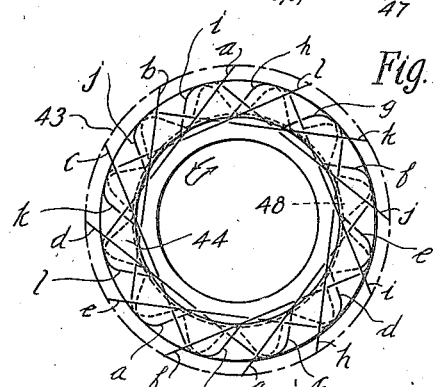
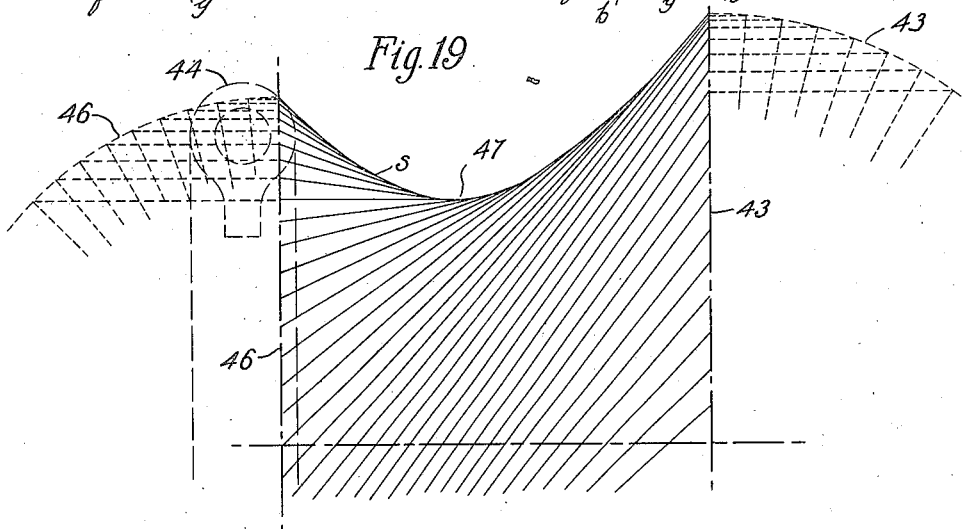
INVENTOR
Thomas Midgley
BY
ATTORNEY Oct. 19, 1926.
T. MIDGLEY
METHOD OF FORMING TIRES
Filed March 1. 1921
1,603,856
5 Sheets-Sheet 3
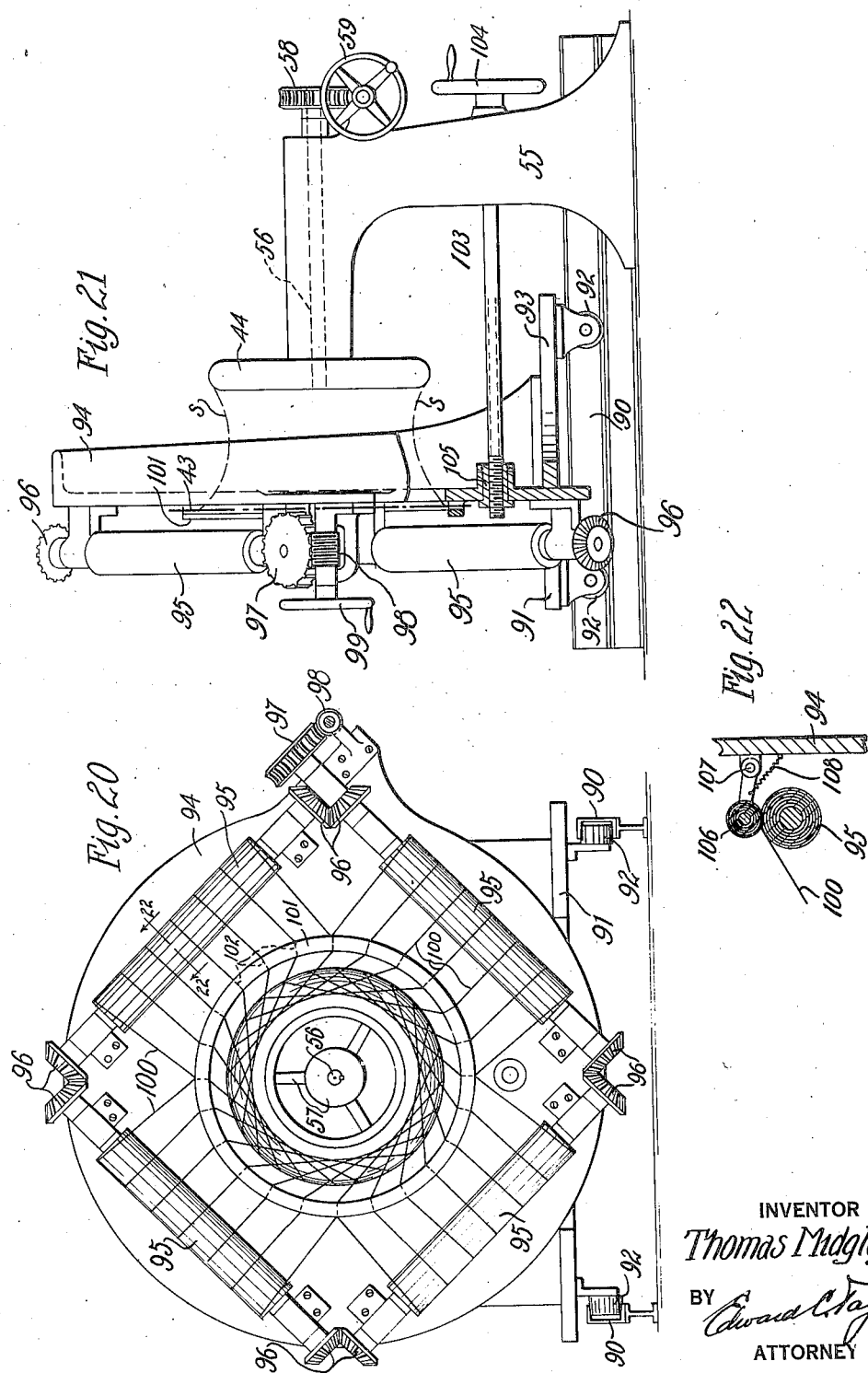
INVENTOR
Thomas Midgley
BY
Edward C. Taylor
ATTORNEY Oct. 19, 1926.
T. MIDGLEY
METHOD OF FORMING TIRES
Filed March 1, 1921  5 Sheets-Sheet 5
1,603,856
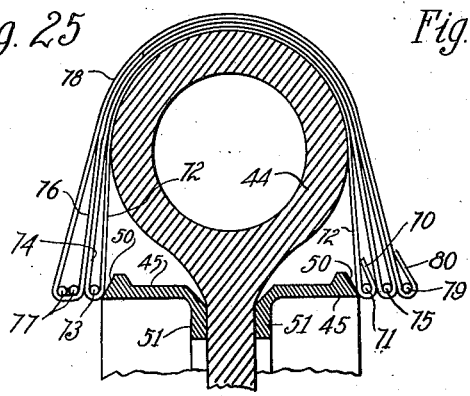
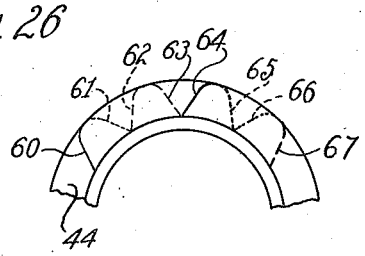
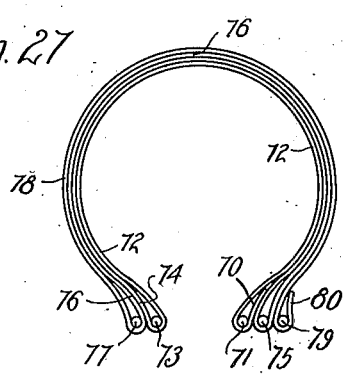
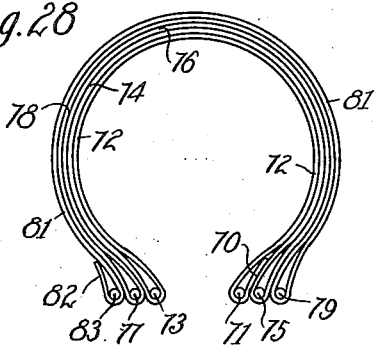
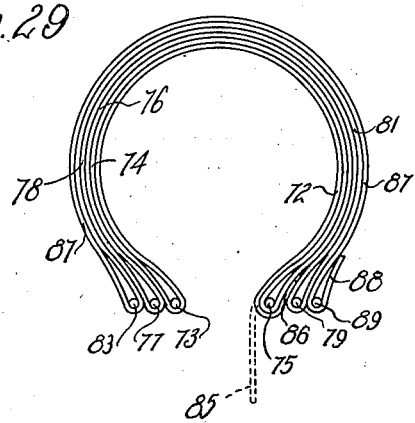
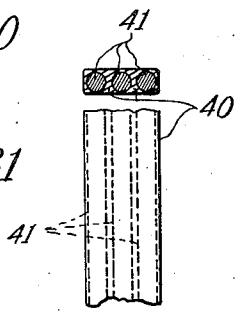
INVENTOR
Thomas Midgley
BY
ATTORNEY Patented Oct. 19, 1926.

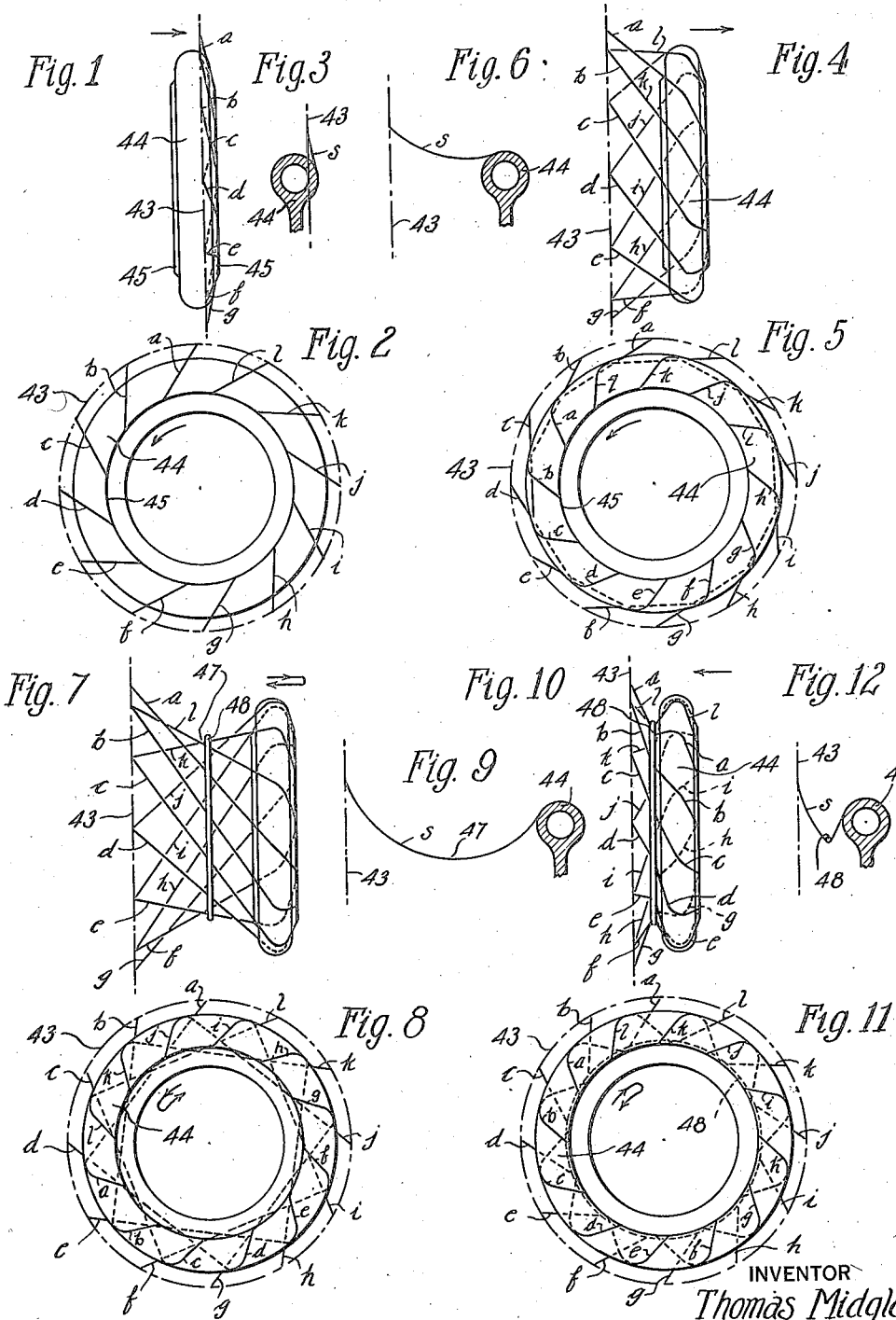

1,603,856

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF FORMING TIRES.

Application filed March 1, 1921. Serial No. 448,891.

My invention relates to what are customarily referred to as cord tires, both as to improvements in the structure of the tires themselves and as to improvements in the method by which they are constructed.

By the term "cord tire" I refer to that type of outer casing for automobile tires in which the strain-resisting elements forming the carcass portion thereof are not interwoven, but in which the strain-resisting elements in any one ply or layer all lie parallel. Various types of methods of producing such tires have been proposed. It is the object of my present invention to improve upon these prior methods and to depart from them in the particulars which will be described, and to produce a tire casing having certain novel and desirable characteristics. In one aspect of my invention I provide a tire casing which has its strain-resisting elements under more uniform conditions of tension and position than have previously been produced. In another aspect I greatly decrease the time necessary for building up the carcass portion of the casing. Other features in which the prior methods and tires have been improved, as well as the manner in which my present method departs from those previously known, will appear from the detailed description which follows.

My invention will now be described with particular reference to the accompanying drawings, in which Fig. 1 is a diagrammatic view of a tire building core illustrating the initial step in my method of laying cords thereon, twelve cords being shown and denoted by the letters a to l respectively;

Fig. 2 is a diagrammatic view from the right in Fig. 1;

Fig. 3 is a diagrammatic view on a slightly larger scale showing the form of the surface defined by the cords between the core and their guided portions;

Figs. 4, 5 and 6 are views similar to Figs. 1, 2 and 3 respectively, showing the relative positions of the core and cords at a slightly later stage;

Figs. 7, 8 and 9 are similar views showing the relative positions at the point of maximum separation of the core and the guided portion of the cords;

Figs. 10, 11 and 12 are similar views showing the relative positions at substantially the point on the return stroke when the direction of relative rotation between the core and the guided portion of the cords reverses;

Figs. 13, 14 and 15 are similar views showing the relative positions at an intermediate point in the formation of the second ply or course;

Figs. 16, 17 and 18 are similar views showing the relative positions at the point of maximum separation of core and guide in the formation of the second ply;

Fig. 19 is a diagrammatic view showing the form of surface of the portion of the cords between their guided portions and the core at substantially the relative positions shown in Fig. 16, the scale being increased and a larger number of cords being shown;

Fig. 20 is an end elevation of an appliance by which my method may conveniently be practiced;

Fig. 21 is a side elevation thereof, partly in section;

Fig. 22 is a detail thereof on line 22—22 of Fig. 20;

Fig. 25 is a section of a core, illustrating diagrammatically four plies of cords laid thereon, and showing the preferred manner of supporting the bead portions during the building operation;

Fig. 26 is a diagrammatic view of a core showing the path of a single cord through four plies or courses;

Fig. 27 is a diagrammatic section of a tire carcass showing an alternative method of constructing the bead anchorages for a four ply carcass;

Fig. 28 is a similar view showing a five-ply carcass;

Fig. 29 is a similar view showing a six-ply carcass with a slightly different type of bead anchorage; and Figs. 30 and 31 are respectively a section and a plan view of a building element such as I prefer to use.

Figure 23:
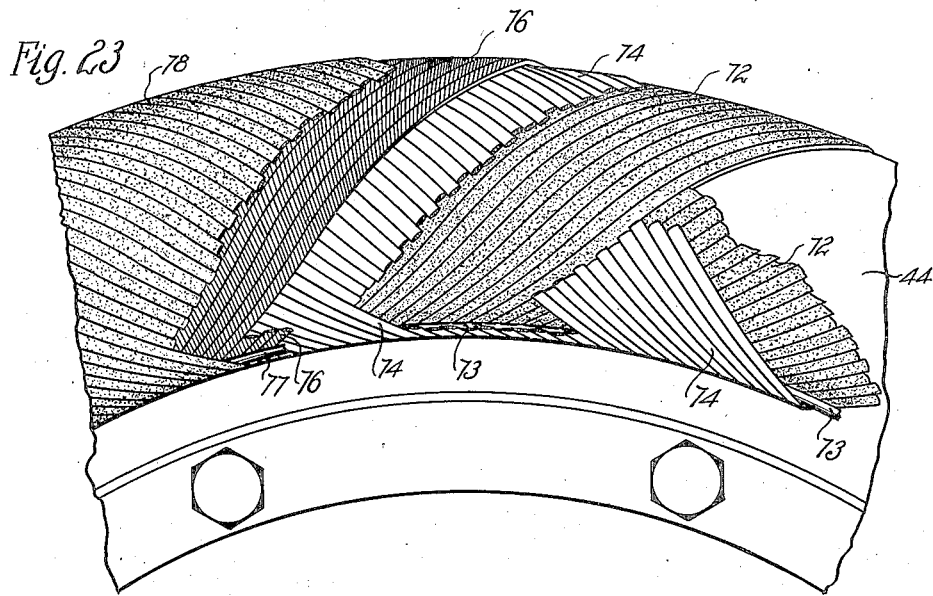
Fig. 23 is a fragmentary diagrammatic side view of a carcass portion of a tire constructed according to my invention, the several plies being partially broken away to clarify the disclosure.

Before dealing with the structure of the tire itself and the advantages therein resulting from the use of my invention it will be desirable to consider my improved method of building tire casings with particular reference to Figs. 1 to 18 and 25. It may here be pointed out that whereas I will for convenience refer to the separate building elements as "cords" I in many cases prefer to use strips 40 such as shown in Figs. 30 and 31, composed of a plurality of cords 41 arranged side by side in a matrix or web of rubber. These strips may conveniently be obtained by severing sheets of ordinary cord fabric into strips preferably containing three cords each, although a larger or smaller number may be employed if desired.

In Figs. 1 to 18 I have illustrated a circumferential series of twelve cords, lettered from a to l, in the process of their application to a tire building support such for example as an annular core in the formation of two plies of the tire carcass. Although a tire can be built up with this, or even a less, number of elements, the necessary total strength being secured by passing the elements back and forth across the core a large number of times, it is generally desirable to use a circumferentially complete series of elements, that is, a number of elements sufficient to form a complete layer or ply upon the core. However, illustration of the building operation by the use of but a relatively small number of elements being clearer than in the case of a large number, twelve elements or cords have been shown, it being understood that the number and spacing of the elements may be varied without departing from the invention. In particular it should be understood that there is not necessarily contact between adjacent elements after they are laid in position in the tire carcass; and that the elements may be arranged to lie adjacent each other at the sides of the carcass and to be slightly separated at the crest of the carcass, the space between them being preferably filled with rubber, which may be the rubber with which the elements are originally coated forced into such spaces during the vulcanizing operation. This feature of the invention is claimed in my copending application Serial No. 478,303 filed June 17, 1921. Furthermore, the elements may be separated by a substantial distance, the space between them being left open, filled with rubber in any desired manner, or closed by later applied elements.

In the preferred manner of practicing my improved method the cords are guided from a circumference 43 greater than the maximum circumference of the core and in a plane parallel to that of the core. The detailed manner in which the cords are guided is not material to my present invention. As one convenient way they may be guided through suitable guide openings in a ring such as 101 in Fig. 20. The points from which individual cords are guided are preferably substantially equally spaced about this guiding circumference. For the purpose of the description of the method the guided portion of the cords will be assumed to be stationary and the core 44 reciprocated and rotated in the direction of the arrows in the several figures, although it will be apparent that the reciprocation and rotation may be given to the guiding circumference instead of to the core, or motion may be given to both of them without changing the result.

In Figs. 1, 2 and 3 I have illustrated the core and the guided portions of the cords in the relative positions that they assume when the cords are first attached to the core. This may for brevity be called the "stringing-up" position, as it is the most convenient position for attaching the cords. It will be noted that the cords extend substantially tangent to the side of the core, but at an angle to the radius thereof, and extend substantially straight from their guided portions to the bead positioning flange 45 on the side of the core. (The purpose and use of this flange will be fully described in connection with Fig. 25.) The cords may be held adjacent the side of the core by being folded around an anchoring wire or by any other suitable means. The surface s (Fig. 3) defined by the series of cords is substantially frusto-conical in this position.

From this position the core is moved in the direction of the arrows in Figs. 4 and 5 to the position of Figs. 4, 5 and 6, which show merely an arbitrary intermediate position without particular significance, and continues its axial and rotatory motions in such directions until it reaches the position of Figs. 7, 8 and 9. The direction of rotation is such as to carry the cords across the crest of the core while maintaining them at the angle or diagonal whatever it may be at which they were first laid at the side of the core as shown for example in Figs. 1 and 2. The effect of these two motions is to cause the surface defined by the series of cords to depart from a conical surface and assume a form which would be referred to by mathematicians as a warped or ruled surface of revolution. The contour of this surface is approximately represented by the line s in Figs. 6 and 9 and is the contour of the surface enveloping all the cords, not the path of any individual cord. Each cord lies in a straight path between its guided portion in circumference 43 and the core, and it is the angular position of all the cords that causes the curved surface. This can perhaps best be understood by analogy from a consideration of two axially separated disks having a large number of cords connecting their circumferences and extending parallel to their common axis. If now these disks be given a relative rotation it will be apparent that the surface formed by the cords will gradually decrease in circumference between the disks, and that if the rotation is carried far enough the cords will all tend to pass through the common axis, causing the surface to become a double cone (slightly distorted on account of the bunching of the cords near the axis). The surface shown in Figs. 7 and 9 is of this type, except that the rotation is carried only to an intermediate position.

This surface has been shown in Fig. 19 by the use of a slightly larger scale and a greater number of cords. In this figure the full lines represent cords, each cord extending in a straight, but angularly disposed, path from a circumference 43, representing the guide for the cords, to a circumference 46, representing the plane of tangency of the cords with the core. This figure does not show the path of the cords after they touch the core, as the purpose is merely to illustrate the character of the surface. The ends of the several cords are evenly spaced on the two circumferences, as shown by the partial end elevations in dotted construction lines. The curve s in this figure is formed by the surface enveloping the straight cords, and is not due to any curve in the cords themselves.

I have devoted this much space to the surface s because of its importance in that its constricted portion 47 permits of the convenient application of a bead anchoring wire or cable 48. This wire (which preferably forms part of the completed casing) is formed to the proper length, its ends brought together around the constricted portion 47 of the surface s, and the ends secured together in any suitable manner, as by welding, soldering, splicing, or by the use of a suitable clip connection. The wire with its ends so joined forms a substantially inextensible annular anchorage restricting the series of cords to the circumference of the wire, which is chosen so as to restrict the cords to the proper bead diameter of the completed casing.

In order to position against the base of the tire the wire so placed the core is moved back towards the guide from the position of Fig. 7 to that of Fig. 10, the cords during this motion being uniformly drawn back through the guide so that the excess length of the cords drawn out from the guide by the relative movement between the guide and the core is taken up and they are kept taut. I may point out here that it is desirable to keep the cords taut or free from slack, with such tension as may be desired, during the entire building operation, both because the cords are more accurately located under this condition and because when cords coated with uncured rubber in a tacky condition are used slackness in the cords will tend to permit sticking of one cord to another. The individual cords are preferably uniformly tensioned, so that every cord in the completed tire is in the best condition to assume its share of the strain. In order to keep the cords in their proper angular position during this motion the core is rotated in the reverse direction (clockwise as shown in Figs. 8 and 11) during the motion from the position of Fig. 7 to substantially that of Fig. 10. The motion between these two positions serves to bring the anchoring wire to a position adjacent the base of the core. The core having already passed through the position of Fig. 10 (somewhere between the positions of Figs. 1 and 4) during the outward or cord-laying stroke, and as the return to the position of Fig. 10 serves only to position the anchoring wire, it will be apparent that in order to avoid shifting the cords from the positions in which they were laid on the outward stroke the direction of rotation must be reversed during the return. It will be seen that in the passage of the core from Fig. 7 to Fig. 10, the anchorage will be shifted along the cords, and by the folding of the cords around the anchorage the latter is ultimately positioned adjacent the cords. The series of cords being kept under balanced tension conditions, they will maintain the anchorage in central relation to the core and will bring it evenly into place. This alone will generally serve as a sufficient means for centering the anchorage, no mechanical devices being necessary.

At the position of Fig. 10, or shortly thereafter, the cords begin their second traverse over the core, and if, as desirable, the second traverse is to extend in the opposite diagonal direction, or, expressed differently, if the direction of the cords laid on the core is to incline always in the same circumferential direction along the core, the core must resume its original counter-clockwise direction of rotation. This is indicated by the reversal of the arrow in Fig. 11. The point at which the change in rotation to the original direction occurs is so chosen that at the time when the cords contact with the side of the core at the beginning of the laying of the next succeeding ply the cords will be in their proper angular position. As the core passes from the position of Fig. 10 to that of Fig. 13 it passes through the guiding circumference 43, the latter being larger than the maximum circumference of the core to permit of this, and continues moving towards the left in the figures with a counter-clockwise rotation until it reaches the position of Fig. 16. By this transposition of the planes of the core and the guided portion of the cords a second course or layer of the cords is laid diagonally across the first as will be apparent from a study of the cords in Figs. 13 and 16. In these figures the cords on the back side of the core, shown dotted in Figs. 1, 4, 7 and 10, have been omitted in the interest of clearness.

When the core is in the position of Fig. 16 (also illustrated in Fig. 19), the cords are disposed in a surface similar to that of Fig. 7 but extending in an opposite direction from the guide 43, and a second anchoring member or wire is then placed in position. The transposition of the planes of the core and guide may be repeated, anchoring members being added after each transposition, until the desired number of plies have been built up. After each transposition there will be a partial return stroke (as from Figs. 7 to 10) during which the core is rotated clockwise, while during the remainder of the stroke the core will be rotated counterclockwise.

These periods of reversed or clockwise rotation are necessitated by the separation of the core and guide to a distance providing for an easy and convenient application of the bead anchorage. If desired, however, the core may be rotated entirely in one direction or, if the cords are desired to be laid straight across the core instead of diagonally, the core may be reciprocated without rotation, according to the following procedure. Starting with the core, guide and cords in the position of Fig. 1 (except that the cords will extend radially instead of angularly if they are to be laid straight across the core), the core is moved axially, and angularly if the cords are to be laid at an angle, according to the arrows in Figs. 1 and 2 until it has reached substantially the position of Fig. 10. At this point the cords will be extending substantially as shown in Figs. 4 and 5, although the reciprocation and rotation will not have proceeded as far as shown in these figures. The cords are then constricted to the base of the core either by the anchoring member itself or by the action of some constricting means which may conveniently take the form of a contractile circular structure similar to an iris diaphragm. This completes the laying of a single course of the elements. A second course is laid by transposing the planes of the core and guide in the same maner as in the preferred procedure, with the exception that the separation of the core and guide will be less. In general, however, it will be preferable to separate the core and guide to substantially the extent shown in Fig. 7, as this both faciltates the positioning of the bead members and gives a more even lay of the cords.

It is preferable in the building of tires according to this method to hold the bead edges away from the sides of the core by bead positioning flanges 45 such as are shown in Fig. 25. As shown, the flanges are provided with beveled abutments 50 supporting the inner edge of the casing in process of construction, and with flanges 51 by which they may be attached to the core. These bead-positioning flanges are desirable since the cords will not normally assume the bent-in or horse-shoe form which the casing takes after vulcanization, but tend to project down the sides of the core in planes parallel to that of the core, due to the fact that this is their shortest possible path. If the abutments 50 are so designed as to hold the cords in this plane the cords will be considerably stretched when they are pressed against the sides of the core prior to or during vulcanization, as the path of the cords down the sides of the core to the circumference of the inextensible anchorages is greater than the path in the plane referred to. For this reason I prefer to construct the flanges so as to hold the bead edges of the carcass rather beyond the plane tangent to the sides of the core, as shown in Fig. 25. The amount by which the edges are held beyond this plane will regulate the amount of stretch given to the cords when forced against the core, and may be greater as the tension under which the cords are applied to the core in the laying operation is increased, so that when the sides of the carcass are finally pressed against the core the cords will be held taut but will not be unduly stretched. If desired the flanges may support the bead edges so far away from the sides of the core that no additional tension will be given to the carcass material when the bead edges are pressed into position against the core.

The preferred method above described may conveniently be practiced by the use of the appliance illustrated in Figs. 20, 21 and 22, or by the mechanism disclosed in my copending application Serial No. 547,081 filed March 27, 1922, in which case is claimed apparatus for carrying out the herein-described method. In this appliance, which is in the nature of hand operated guides for facilitating and increasing the accuracy of the positioning of the cords, I have illustrated the reciprocating motion as being furnished by the guide for the cords, instead of by the core as described above. It will readily be recognized, however, that this is an immaterial inversion. The rotary motion has been shown as furnished by the core.

The core 44 is supported from a stationary standard 55. A shaft 56, passing through the upper portion of the standard, carries the core by means of a spider construction 57, and is rotatable by means of a worm wheel 58 engaging a worm on the shaft of a hand wheel 59. By this means the angular position of the core may be varied. Running on rails 90, preferably constructed as channels so as to provide a holding-down means for the carriage, is a carriage 91 having rolls 92 engaging the rails. The carriage is provided with a cut-away portion 93 permitting it to clear the standard 55 and carries a frame 94. This frame carries a series of reels 95, four in number as shown, suitably journaled thereon and preferably connected together for simultaneous rotation by gearing 96. On the shaft of one of the reels is a worm wheel 97 meshing with a worm 98 on the shaft of a hand wheel 99. The reels 95 carry cords 100, a small number only being shown, which pass from the reels to an annular guide 101, the center line 43 of which corresponds to the guiding circumference 43 in Figs. 1 to 19. Holes 102 in the guide serve to direct the cords and preserve them in their spaced relation. These holes may be provided with suitable rollers or other anti-friction devices if desired. By rotating the hand wheel 99 in one direction the cords may be unwound from the reels so that they may be drawn through the guide, and by rotating it in the other direction the cords will be drawn back through the guide. A screw 103, provided with a hand wheel 104, meshes with a nut 105 in the frame 94 and serves to move carriage 91, together with the reels and guide, toward or away from the core. In Fig. 22 I have shown a roll 106 pivotally supported at 107 and pressed against roll 95 by a spring 108, this roll serving to wind up a liner or fabric strip that may be wound between the layers of rubberized cords on the reel.

The operation of this appliance will be apparent from the above, but may be briefly summarized here. Cords 100 are led from the reels through the guide 101 and are attached to the core in any convenient manner. One manner of accomplishing this is by folding them around an anchoring wire positioned adjacent one side of the core. This may conveniently be accomplished while the relative position of the core and guide are such as shown in Figs. 1 and 2, as in this position the determination of the proper position of the cords is somewhat easier. Assuming the cords to be initially adjusted in position, the core and guide are separated through the medium of hand-wheel 104 until they reach the position of Figs. 7 and 21. The surface s formed by the cords is shown in dash lines in the latter figure. During this motion of separation the core is rotated by hand wheel 59 and cords are unwound from the reels by hand wheel 99. When the parts are in the position of Fig. 21, an anchoring member is applied over the series of cords as previously described, and the guide moved back to the position of Fig. 10 by hand wheel 104. In this movement the core is rotated in the reverse direction, the original direction of rotation being resumed as the guide proceeds from this position to that of Fig. 16. During the motion from the position of Fig. 21 to that of Fig. 16 the cords are kept taut at all times by rotating hand-wheel 99, the cords being drawn back through the guide until the cords are in substantially the plane of the guide (that is, when the guide is just starting to pass over the core) and being fed out through the guide during the remainder of the stroke. This sequence of operations may be repeated until the desired number of plies has been laid on the core. After the carcass is completed a convenient manner of severing the cords to permit the removal of the finished carcass without disturbing the relationship between the several cords is to secure around the series of cords an adhesive strip of rubberized fabric. The cords may then be cut between the core and the strip, the strip serving to prevent the cords becoming tangled or stuck together and affording a ready means of holding the cords during the process of securing them to a succeeding core. Another method of transferring from the building of one tire to another is set forth in my copending application Serial No. 519,583 filed December 3, 1921.

I will now turn to a description of the improved tire casing which has certain constructional and operating advantages inherent in it wholly apart from the particular method by which it is produced and still other advantages arising from the method of construction disclosed above. The preferred form of carcass is composed of a circumferentially complete series of separate cords or building elements anchored in one bead portion, and carried back and forth across the casing to produce the desired number of layers, each separate cord passing around an annular anchorage in the bead after each traverse, and progressing in a zig-zag manner circumferentially of the casing as it finds itself in successively applied layers. The path of a single cord in a four ply carcass has been shown diagrammatically in Fig. 26. In that figure 60 represents the cord on the front side of the core (as viewed in the drawings, there being strictly speaking no front nor back). The cord passes over the crest of the core diagonally, passing down the back side of the core as at 61. This completes the travel of the cord in forming the first ply, it being understood that enough other cords to form a circumferentially complete series are carried across the core during the formation of the first ply. In forming the second ply the cords pass up the back side of the core as at 62, diagonally across the crest and down the front side at 63. Between sections 61 and 62 of the cord it passes under an annular anchorage. Sections 62 and 63 form the second ply when combined with the remaining cords of the circumferential series. The third ply is formed by the cords passing as at 64, 65; and the fourth ply as at 66, 67. The zig-zag path of a single cord circumferentially of the carcess and progressively through successive layers is clearly apparent from this view.

In Fig. 23 I have shown a side view of the carcass portion of a casing with the plies partially broken away to disclose the construction. As illustrated in this figure a circumferential series of separate cords, anchored at the reverse side of the carcass (Figs. 24 and 25) by folding at 70 around an annular anchorage 71, are laid diagonally across the core to form the first ply 72. These cords pass under a second anchorage 73 and pass back across the carcass so that they cross the cords of the first ply, thereby forming the second ply 74. The series of cords after this second traverse across the core pass around an anchorage 75 and again cross the carcass to form the third ply 76. In a similar manner the cords pass around an anchorage 77 and back across the core to form the fourth ply 78, this ply being anchored by folding the cords around an anchorage 79 as at 80.

From the above description of a four-ply carcass it will be apparent that there will be three separate anchorages in one side of the tire and but two in the other. In order to equalize the amount of metal in the two beads one or the other of the anchorages 73 or 77 (77 as shown) is preferably composed of two parallel annular members. This it not essential, and, as shown in Fig. 27, the beads may be made unsymmetrical with respect to each other if desired. In Fig. 28 I have shown a five ply carcass, the only difference being that instead of stopping the construction by folding the fourth ply at 80 around anchorage 79 it is continued to form a fifth ply 81, this ply being anchored by being folded at 82 around an anchorage 83. This construction, having an odd number of plies, will give a symmetrical bead.

In Fig. 29 I have shown an alternative construction whereby I am enabled to produce symmetrical beads with an even number of plies. According to this construction the inner ply 72, instead of being folded as at 70 around the anchorage 71, is secured in any suitable way, as by being clamped under flange 45 (Fig. 25) until the second ply 74 is carried around anchorage 75 to start the third ply 76. The end 85 of the first ply 72 (shown dotted in Fig. 29) is then folded at 86 around anchorage 75 and the ply 74 previously passed around it. The formation of the carcass is then completed as with the other forms of construction, ply 81 being continued around anchorage 83 to form a sixth ply 87, which is folded as at 88 around an anchorage 89.

It will be apparent from the above that the tire produced will have all the cords laid under substantially equal conditions. For this reason the individual tensions of the cords will be equal when laid, and will be undisturbed during subsequent operations, which is not true of any other type of cord tire construction of which I am aware. Another advantage inherent in this tire is that the cords at the bead preserve their angularity and do not take a sudden bend towards a radial line, as is true of ordinary tire constructions. This latter feature is of material advantage in transmitting strains from the tread to the beads and vice-versa, as the cords lie practically in the line which the strain tends to take; and thus avoids lateral shifting of the cords when strain is applied.

Figure 24:
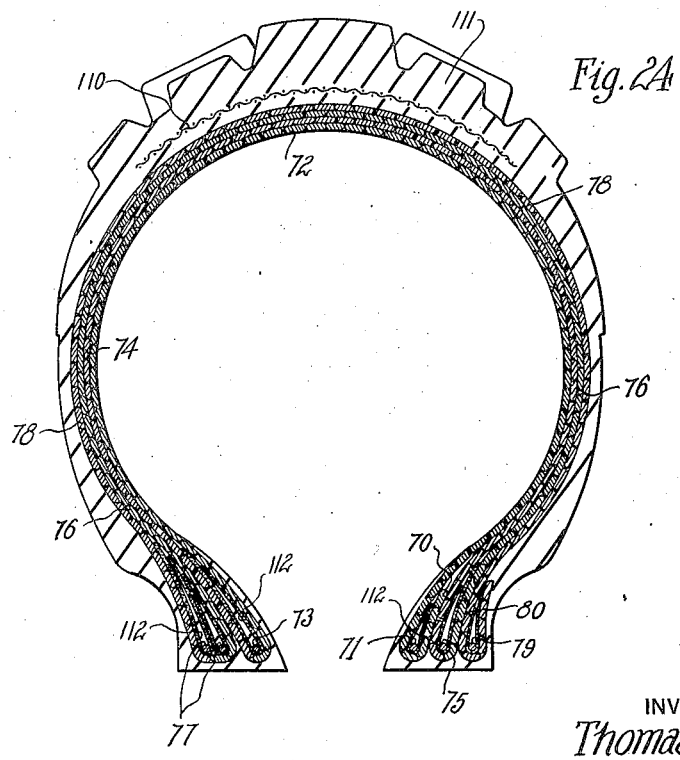
Fig. 24 is a transverse section of the completed tire.

The tire casing shown in section in Fig. 24 has been completed by the addition of a breaker strip 110 and covering rubber 111; and the bead anchoring members have been shown as provided with so-called "flipper strips" 112 which encircle the anchoring members and extend between adjacent plies of cords, serving both to strengthen the anchorage and to prevent abrasion of the cords by the anchorage. These additions to the carcass may be varied without departing from my invention, which relates to the formation of the carcass portion itself.

Having thus described my invention, I claim:

1. A method of ply formation in the building of tire carcasses, which comprises securing a circumferential series of elements in the carcass structure, guiding the elements from points at all times further from the axis of the carcass than the outside of the carcass structure, and causing the elements to extend across the carcass by relative axial displacement between the carcass and the guiding points.

2. A method of forming successive plies in the building of such tire carcasses as are composed of reversely laid courses of a circumferential series of building elements, which comprises securing the series of elements in the carcass structure, guiding the elements from points at all times further from the axis of the carcass than the outside of the carcass structure, repeatedly transposing the relative positions of the carcass and the guiding points in the direction of the axis of the carcass, and securing the elements in the edges of the carcass between successive transpositions.

3. A method of forming successive plies in the building of such tire carcasses as are composed of reversely laid courses of a circumferential series of building elements, which comprises securing the series of elements in the carcass structure, guiding the elements at all times from points further from the axis of the carcass than the outside of the carcass structure, repeatedly transposing the relative positions of the carcass and guiding points in the direction of the axis of the carcass, and twisting the series of elements at each transposition by a relative rotation between the carcass and the guiding points, so that the elements are positioned diagonally.

4. A method of ply formation in the building of tire carcasses, which comprises securing a circumferential series of elements in the tire structure, guiding the elements from points in a circle of constant circumference greater than that of the carcass, and causing the elements to extend across the carcass by relative axial displacement between the carcass and the guiding points.

5. A method of forming successive plies in the building of such tire carcasses as are composed of reversely laid courses of a circumferential series of building elements, which comprises securing the series of elements in the carcass structure, guiding the elements from points in a circle of constant circumference greater than that of the carcass, repeatedly transposing the relative positions of the carcass and guiding points in the direction of the axis of the carcass, and securing the elements in the edges of the carcass between successive transpositions.

6. A method of forming successive plies in the building of such tire carcasses as are composed of reversely laid courses of a circumferential series of building elements, which comprises securing the series of elements in the carcass structure, guiding the elements at all times from points in a circle of constant circumference greater than that of the carcass, repeatedly transposing the relative positions of the carcass and guiding points in the direction of the axis of the carcass, and twisting the series of elements at each transposition by a relative rotation between the carcass and the guiding points, so that the elements are positioned diagonally.

7. The method of laying a circumferential series of building elements upon a core in the manufacture of a tire casing comprising holding the elements adjacent one side of the core, guiding the elements from a circumference greater than that of the core, separating and relatively rotating the core and the guiding circumference so that the elements are laid diagonally over the crest of the core and a convenient distance between the core and the guiding circumference is provided to permit of the application of an annular anchorage to the series of elements, applying an annular anchorage to the series of elements, transposing the planes of the core and guiding circumference whereby the elements are laid in a second layer across the core, and relatively rotating the core and the guiding circumference in the reverse of the original direction during the first part of the movement of transposition and in the original direction during the latter part thereof whereby the elements in the second layer are disposed so as to cross the elements in the first layer.

8. The method of laying a circumferential series of building elements upon a core in the manufacture of a tire casing comprising holding the elements adjacent one side of the core, guiding the elements from a circumference greater than that of the core, axially separating the core and the guiding circumference in a direction to cause the elements to be laid over the crest of the core, simultaneously revolving the core and the guiding circumference relative to each other to cause the elements to be laid across the core at an angle, continuing the separation and revolution sufficiently to cause the series of elements to lie in a warped surface having at one part a reduced circumference at least as small as the bead circumference of the core, placing an annular anchorage around the reduced circumference of said warped surface so as to embrace the series of elements, and transposing the planes of the core and of the guiding circumference whereby the anchorage is drawn towards the side of the core and the elements are again laid across the crest of the core.

9. The method of laying a circumferential series of building elements upon a core in the manufacture of a tire casing comprising holding the elements adjacent one side of the core, guiding the elements from a circumference greater than that of the core, axially separating the core and the guiding circumference in a direction to cause the elements to be laid over the crest of the core, simultaneously revolving the core and the guiding circumference relative to each other to cause the elements so laid to cross the crest of the core at an angle, continuing the separation and revolution sufficiently to cause the series of elements to lie in a warped surface having at one part a reduced circumference at least as small as the bead circumference of the core, placing an annular anchorage around the reduced circumference of said warped surface so as to embrace the series of elements, moving the core and the guiding circumference toward each other and rotating them relatively in the reverse of the original direction until the anchorage is drawn substantially adjacent the side of the core, and again separating the core and the guiding circumference but with their planes transposed and simultaneously relatively rotating the core and the guiding circumference in the original direction so as to lay over the core a second course of elements so disposed as to cross the elements in the first course, the portion of the elements between the core and the guiding circumference being kept substantially taut during these operations.

10. A method of laying a ply of building elements in the building of a tire carcass which comprises arranging the elements around a circumference to start the ply, guiding the elements from points at all times outside such circumference, and laying the elements across the carcass structure and causing them to pass within a circumference small enough to permit of the elements being anchored, solely by relative motion between the carcass structure and the guiding points.

11. A method of building a tire carcass which comprises carrying a circumferential series of cords across a circular building support so that lengths of the cords project to one side of the support, encircling the cords at a circumference spaced from the support with an annular anchorage, and positioning the anchorage adjacent the support by drawing the cords around the anchorage and back towards the support.

12. A method of building a tire carcass which comprisese carrying a circumferential series of cords across a circular building support so that lengths of the cords project to one side of the support, encircling the cords at a circumference spaced from the support with an annular anchorage, and positioning the ancorage adjacent the side of the support by drawing the cords around the anchorage and back towards the support and maintaining the tension of the individual cords uniform so as to center the anchorage with respect to the support.

13. In a method of building cord tires, first assembling independent cord groups in spaced relation to each other, each group consisting of a plurality of cords, and then simultaneously moving said cord groups into applied position upon a tire forming core to form a single continous annular layer of cords.

14. In a method of making laminated tire structures, that step which consists in simultaneously assembling a plurality of independent sections to form in their entirety a single circumferentially continous lamination and concurrently with the assemblage of said sections, shaping the same in conformity to the cross-sectional contour of a tire.

15. The method of making a laminated tire structure having a plurality of circumferentially continuous superimposed laminations, which consists in applying each individual lamination of the tire in a series of simultaneously assembled independent sections each constituting a circumferential portion of a complete lamination and simultaneously shaping all of the sections comprising the continuous lamination in conformity to the cross-sectional contour of a tire.

16. A method of ply formation in the building of tire carcasses, which includes securing a circumferentially complete ply of material at one side of the tire structure, guiding the material from a circle of constant circumference greater than that of the tire carcass, and causing the material to extend across the tire carcass by relative axial displacement between the carcass and the guided circle of material.

17. A method of forming successive plies in the building of a tire carcass, which comprises securing in the carcass structure a circumferentially complete ply of material, guiding the material from a circle of constant circumference greater than that of the carcass, repeatedly transposing the relative positions of the carcass structure and the guided circle of material in the direction of the axis of the carcass, and restricting and securing the material in the bead edges of the carcass between successive transpositions.

18. A method of forming successive plies in the building of a tire carcass, which comprises securing in the carcass structure a circumferentially complete ply of material, guiding the material from a circle of constant circumference greater than that of the carcass, repeatedly transposing the relative positions of the carcass and the guided circle of material in the direction of the axis of the carcass, restricting and securing the material in the bead edges of the carcass structure between successive transpositions, and causing a relative rotation between the carcass and the guided circle of material at each transposition so that the material will be disposed diagonally in the carcass.

19. A method of building tire casings which comprises attaching a circumferentially complete ply of material to one side of a tire building form, carrying the material across the form and to the other side thereof, causing a trough-shaped contraction in the material, locating a bead anchorage around the contracted portion and in said trough, and carrying the material back across the form to enclose the bead anchorage in a fold thereof.

THOMAS MIDGLEY.